US010043366B2

(12) United States Patent
Gorzela et al.

(10) Patent No.: US 10,043,366 B2
(45) Date of Patent: Aug. 7, 2018

(54) PERSONAL SAFETY MONITORING

(71) Applicant: International Business Machines Corporation, Armonk, NY (US)

(72) Inventors: Richard Gorzela, Andover, MA (US); Asima Silva, Holden, MA (US); Jaime M. Stockton, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/296,804

(22) Filed: Oct. 18, 2016

(65) Prior Publication Data

US 2018/0108237 A1  Apr. 19, 2018

(51) Int. Cl.
  *G08B 23/00* (2006.01)
  *G08B 21/04* (2006.01)
  (Continued)

(52) U.S. Cl.
  CPC ........ *G08B 21/0423* (2013.01); *H04L 67/22* (2013.01); *H04L 67/306* (2013.01)

(58) Field of Classification Search
  CPC .... G08B 21/0423; H04L 67/22; H04L 67/306
  (Continued)

(56) References Cited

U.S. PATENT DOCUMENTS 7,346,492 B2  3/2008  Shaw
8,515,049 B2  8/2013  Chavez et al.
(Continued)

FOREIGN PATENT DOCUMENTS

WO  2013023265 A1  2/2013
WO  2015019360 A1  2/2015

OTHER PUBLICATIONS

Novotney, A. "Students Under Pressure," American Psychological Association, Sep. 2014, vol. 45, No. 8 [retrieved from the Internet: <http://www.apa.org/monitor/2014/09/cover-pressure.aspx>, 5 pg.
(Continued)

*Primary Examiner* — Jack K Wang
(74) *Attorney, Agent, or Firm* — Cuenot, Forsythe & Kim, LLC (57) ABSTRACT

A baseline historical record for a person is formed by monitoring information about the person derived from at least one information source over a baseline period of time. A baseline pattern of behavior of the person is established by applying analytic analysis to the baseline historical record. A current pattern of behavior of the person is determined by monitoring current information about the person derived from the at least one information source. A behavior change assessment is determined by comparing the current pattern of behavior to the baseline pattern of behavior. Whether the behavior change assessment for the person meets at least one safety concern criterion is determined by comparing the behavior change assessment to safety concern criteria comprising the at least one safety concern criterion. Responsive to determining the behavior change assessment for the person meets the at least one safety concern criterion, an action is automatically performed.

20 Claims, 3 Drawing Sheets

(51) Int. Cl.
*H04L 29/08* (2006.01)
*G08B 13/08* (2006.01)
*G06F 11/00* (2006.01)

(58) Field of Classification Search
USPC .................................................. 340/573.1
See application file for complete search history.

(56) References Cited

U.S. PATENT DOCUMENTS

| | | | |
|---|---|---|---|
| 8,560,267 B2 | 10/2013 | Jangle et al. | |
| 9,253,139 B1 | 2/2016 | Fisher et al. | |
| 9,317,834 B2 | 4/2016 | Horvitz et al. | |
| 2014/0025724 A1 | 1/2014 | Granger et al. | |
| 2015/0127653 A1 | 5/2015 | Keng et al. | |
| 2015/0180746 A1 | 6/2015 | Day, II et al. | |
| 2015/0205335 A1 | 7/2015 | Teshome et al. | |
| 2015/0213002 A1 | 7/2015 | Gou et al. | |
| 2015/0325094 A1 | 11/2015 | Cheng et al. | |
| 2015/0370993 A1* | 12/2015 | Moturu | G06F 19/3437 703/6 |
| 2016/0066864 A1 | 3/2016 | Frieder et al. | |
| 2016/0189496 A1* | 6/2016 | Modi | G08B 13/08 340/545.2 |
| 2016/0220198 A1* | 8/2016 | Proud | A61B 5/4809 |
| 2016/0330601 A1* | 11/2016 | Srivastava | H04W 4/22 |
| 2017/0032248 A1* | 2/2017 | Dotan-Cohen | G06N 5/02 |

OTHER PUBLICATIONS

"Safety Check," [Online] Facebook © 2016 [retrieved Jul. 5, 2016] retrieved from the Internet: <https://www.facebook.com/about/safetycheck/> 2 pg.

Negnevitsky, M. et al.; "Email Communication Analysis: How to Use Computational Intelligence Methods and Tools", IEEE Int',. Conf. on Computational Intelligence for Homeland Security and Personal Safety, CIHSPS, Mar. 31-Apr. 1, 2005, pp. 16-23.

Yu, A. et al., "Personalized Awareness and Safety With Mobile Phones As Sources and Sinks", Int'l. Workshops on UrbanSense08, Nov. 4, 2008, pp. 26-30.

* cited by examiner

PERSONAL SAFETY MONITORING

BACKGROUND

The present invention relates to data processing systems and more specifically, to safety monitoring systems.

Systems are commercially available that allow caregivers to remotely monitor patients and people using assisted living services. Such a system may include sensors, such as video cameras, microphones and motion sensors, installed in the home of a person being monitored. A caregiver can remotely access data generated by such sensors via the Internet to check on the person. If the caregiver determines that the person is in need of assistance, the caregiver can dispatch someone to provide the needed assistance.

SUMMARY

A method includes forming a baseline historical record for a person by monitoring information about the person derived from at least one information source over a baseline period of time. The method also can include establishing a baseline pattern of behavior of the person by applying analytic analysis to the baseline historical record. The method also can include determining a current pattern of behavior of the person by monitoring current information about the person derived from the at least one information source. The method also can include determining, using a processor, a behavior change assessment for the person by comparing the current pattern of behavior to the baseline pattern of behavior. The method also can include determining whether the behavior change assessment for the person meets at least one safety concern criterion by comparing the behavior change assessment to safety concern criteria comprising the at least one safety concern criterion. The method also can include, responsive to determining the behavior change assessment for the person meets the at least one safety concern criterion, automatically performing an action.

A system includes a processor programmed to initiate executable operations. The executable operations include forming a baseline historical record for a person by monitoring information about the person derived from at least one information source over a baseline period of time. The executable operations also can include establishing a baseline pattern of behavior of the person by applying analytic analysis to the baseline historical record. The executable operations also can include determining a current pattern of behavior of the person by monitoring current information about the person derived from the at least one information source. The executable operations also can include determining a behavior change assessment for the person by comparing the current pattern of behavior to the baseline pattern of behavior. The executable operations also can include determining whether the behavior change assessment for the person meets at least one safety concern criterion by comparing the behavior change assessment to safety concern criteria comprising the at least one safety concern criterion. The executable operations also can include, responsive to determining the behavior change assessment for the person meets the at least one safety concern criterion, automatically performing an action.

A computer program includes a computer readable storage medium having program code stored thereon. The program code is executable by a processor to perform a method. The method includes forming, by the processor, a baseline historical record for a person by monitoring information about the person derived from at least one information source over a baseline period of time. The method also can include establishing, by the processor, a baseline pattern of behavior of the person by applying analytic analysis to the baseline historical record. The method also can include determining, by the processor, a current pattern of behavior of the person by monitoring current information about the person derived from the at least one information source. The method also can include determining, by the processor, a behavior change assessment for the person by comparing the current pattern of behavior to the baseline pattern of behavior. The method also can include determining, by the processor, whether the behavior change assessment for the person meets at least one safety concern criterion by comparing the behavior change assessment to safety concern criteria comprising the at least one safety concern criterion. The method also can include, responsive to determining the behavior change assessment for the person meets the at least one safety concern criterion, automatically performing, by the processor, an action.

DETAILED DESCRIPTION

The present invention relates to data processing systems and more specifically, to safety monitoring systems. In accordance with the inventive arrangements disclosed herein, a current pattern of behavior of a person can be monitored and compared to a baseline pattern of behavior to identify a behavior change assessment for the person. The current pattern of behavior can be derived by monitoring current information about the person derived from one or more information sources, examples of which include, but are not limited to, a social networking service, a web based forum, an electronic messaging system, an e-mail system, an electronic calendaring system and an activity detection device. Responsive to determining the behavior change assessment for the person meets at least one safety concern criterion, an action can be automatically performed. For example, a notification can be automatically communicated to a user. The user to whom the notification is communicated can be a user who is pre-authorized to receive the notification, for example a caregiver, family member and/or friend of the person.

Several definitions that apply throughout this document now will be presented.

As defined herein, the term "baseline historical record" means data pertaining to a person derived from at least one information source over a baseline period of time.

As defined herein, the term "baseline pattern of behavior" means data indicating a historical behavioral pattern of a person.

As defined herein, the term "current pattern of behavior" means data indicating a current behavioral pattern a person.

As defined herein, the term "behavior change assessment" means data indicating at least aspects of a behavioral pattern of a person that, as indicated in a current pattern of behavior, are different from a baseline pattern of behavior. The data also may, but need not, indicate aspects of the behavioral pattern of the person that, as indicated in a current pattern of behavior, correspond to the baseline pattern of behavior.

As defined herein, the term "safety concern criteria" means a standard to which information about a person, such as behavior change assessment data, is evaluated to determine whether there should be a concern about the safety of the person.

As defined herein, the term "concern" means a matter of interest or importance to someone.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "web based forum" means is an online discussion site where people can post messages that are viewable by other people. For example, people can hold conversations in a web based forum by posting messages. Some messages posted in a web based forum may be responses to other posted messages, or ask questions related to other posted messages. As the term "web based forum" is defined herein, a messaging service per se (e.g., an e-mail service, a text messaging service, or an instant messaging service) is not a web based forum, though a web based forum can include an e-mail messaging service, a text messaging service and/or an instant messaging service in addition to one or more web based forum components.

As defined herein, the term "social networking service" means an online service platform on which social networks or social relations are built among people who, for example, share interests, activities, backgrounds or real-life connections, and via which people can share information with one another. People can hold conversations in a social networking service by posting messages. As the term "social networking service" is defined herein, a messaging service per se (e.g., an e-mail service, a text messaging service, or an instant messaging service) is not a social networking service, though a social networking service can include an e-mail messaging service, a text messaging service and/or an instant messaging service in addition to one or more social networking components.

As defined herein, the term "post" means to enter a message in a thread of a web based forum or social networking service. A new thread can be created in which to enter the message, or the message can be entered into an existing thread.

As defined herein, the term "electronic message" means an e-mail or a text message sent to at least one user.

As defined herein, the term "e-mail" means an electronic mail delivered via a communication network to at least one user. An e-mail may be sent by one user to one or more other users. In this regard, an e-mail typically identifies at least recipient using a user name (e.g., e-mail address) corresponding to the recipient, or a group name corresponding to a group of recipients, in at least field within the e-mail, for example within a "To" field, "Cc" field and/or "Bcc" field in a header of the e-mail. A recipient may view an e-mail via an e-mail client, which may execute on a client device or a server to which a client device is communicatively linked.

As defined herein, the term "text message" means an electronic message comprising text delivered via a communication network to at least one user identified as a recipient. A text message may be sent by one user to one or more other users. In this regard, a text message typically identifies at least one recipient using a user name, telephone number or the like. A text message also may comprise audio, image and/or multimedia content. A text message can be delivered, for example, using the short message service (SMS), the text messaging service (TMS) and/or the multimedia messaging service (MMS). A text message also may be referred to as an "instant message." As defined herein, a text message itself is not a result generated by an Internet search engine per se, although a text message may contain one or more uniform resource identifiers, such as hyperlinks, which can be generated by an Internet search engine and copied, for example by a user (e.g., sender), into the text message. In this regard, if a user uses a web browser to access an Internet search engine to perform an Internet search, and the user receives results from the Internet search engine in the web browser, such results are not a text message as the term text message is defined herein.

As defined herein, the term "natural language analysis" means a process that derives a computer understandable meaning of a human language.

As defined herein, the term "human language" is a language spoken or written by human beings that is not a computer programming language. A "human language" may be referred to as a "natural language."

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
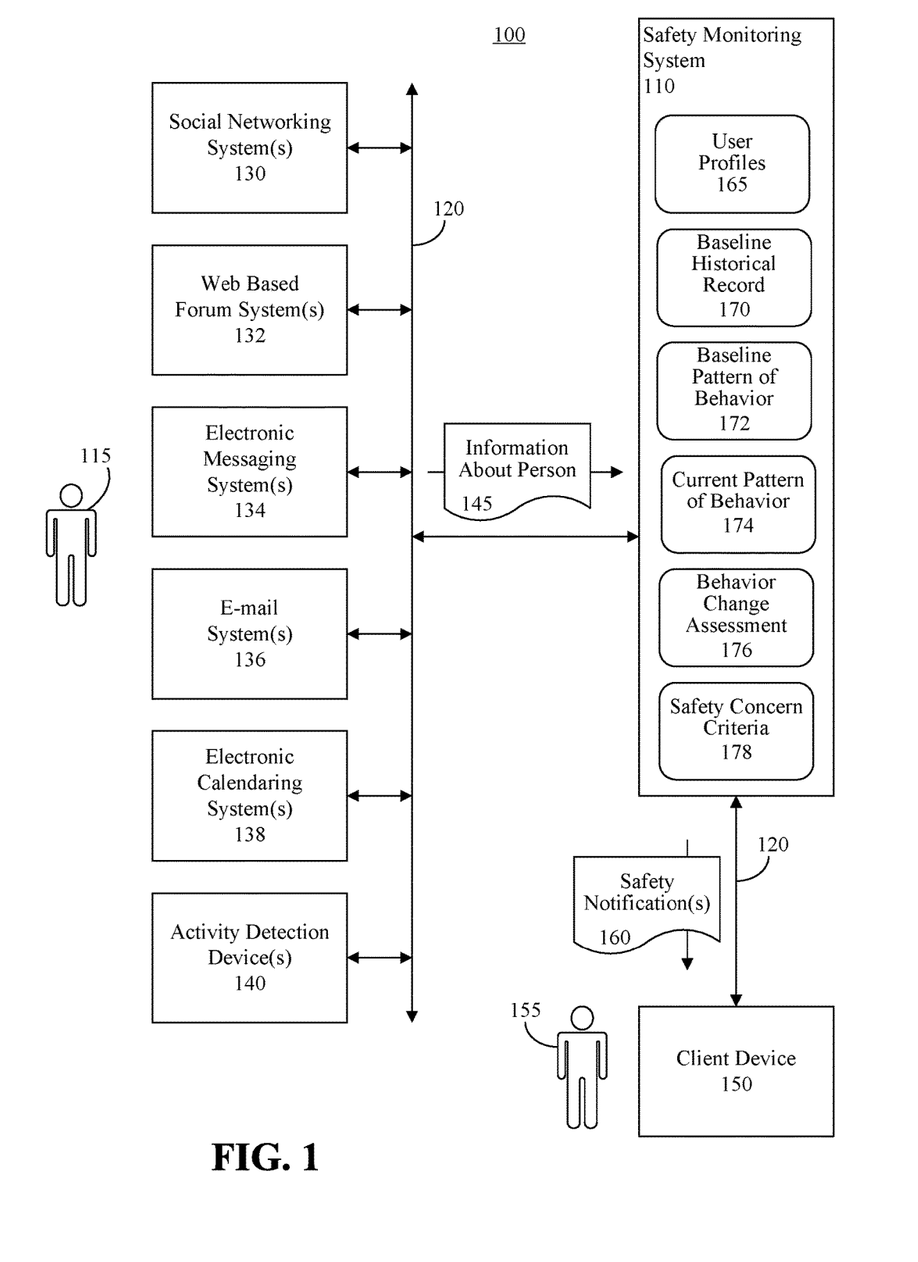
FIG. 1 is a block diagram illustrating an example of a computing environment.

FIG. 1 is a block diagram illustrating an example of a computing environment 100. The computing environment 100 can include a safety monitoring system 110 configured to monitor the safety of one or more people, for example a person 115. In this regard, the safety monitoring system 110 can be communicatively linked to one or more information sources, 130, 132, 134, 136, 138, 140 from which information 145 about the person 115 can be obtained. The safety monitoring system 110 can be communicatively linked to the information sources 130-140 via at least one network 120. The network 120 is the medium used to provide communications links between various devices and data processing systems connected together within the computing environment 100. The network 120 may include connections, such as wire, wireless communication links, or fiber optic cables. The network 120 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

The information sources 130-140 can include, for example, a social networking system 130, which can host one or more social networking services used by the person 115. The information sources 130-140 also can include one or more web based forum systems 132, which can host one or more web based forums used by the person 115. In illustration, the person 115 can participate in the social networking service(s) and/or web based forum(s) by posting messages in the social networking service(s) and/or web based forum(s), reading messages posted by other users of the social networking service(s) and/or web based forum(s), accessing information (e.g., web based resources, publications, etc.) via links or hyperlinks contained in posted messages, etc.

The information sources 130-140 also can include one or more electronic messaging systems 134 via which the person 115 exchanges text messages and/or multimedia messages with other people, and/or one or more e-mail systems 136 via which the person 115 exchanges e-mails with other people. The information sources 130-140 also can include one or more calendaring systems 138 via which the person 115 manages and electronic calendar, for instance by creating calendar entries, deleting calendar entries, moving calendar entries, etc.

Further, the information sources 130-140 can include one or more activity detection devices 140 configured to detect activities of the person 115. An example of an activity detection device 140 is a smart phone having a global positioning system (GPS) receiver configured to monitor the location of the smart phone, and thus the location of the person 115 when the person 115 is carrying or traveling with the smart phone. Another example of an activity detection device 140 is a wearable device that detects the location, activities and/or biometric parameters of the person 115, for example a smart watch, smart glasses, a medical alert bracelet, a medical alert necklace, and so on. Other examples of activity detection devices 140 include motion detectors, cameras, microphones, etc. installed in a home of the person 115. Still, any of a myriad of other activity detection devices 140 can be used as information sources 130-140 and the present arrangements are not limited in this regard.

The computing environment 100 can include at least one client device 150 configured to communicatively link to the safety monitoring system 110 via the at least one network 120. The client device 150 can be used by a user 155 to review safety notifications 160 and other information communicated from the safety monitoring system 110 to the client device 150. The user 155 can be, for example, a caregiver who provides care for the person 115, a family member of the person 115, or a friend of the person 115. In one arrangement, the user 155 can be pre-authorized to receive the safety notifications 160 and other information.

Figure 2:
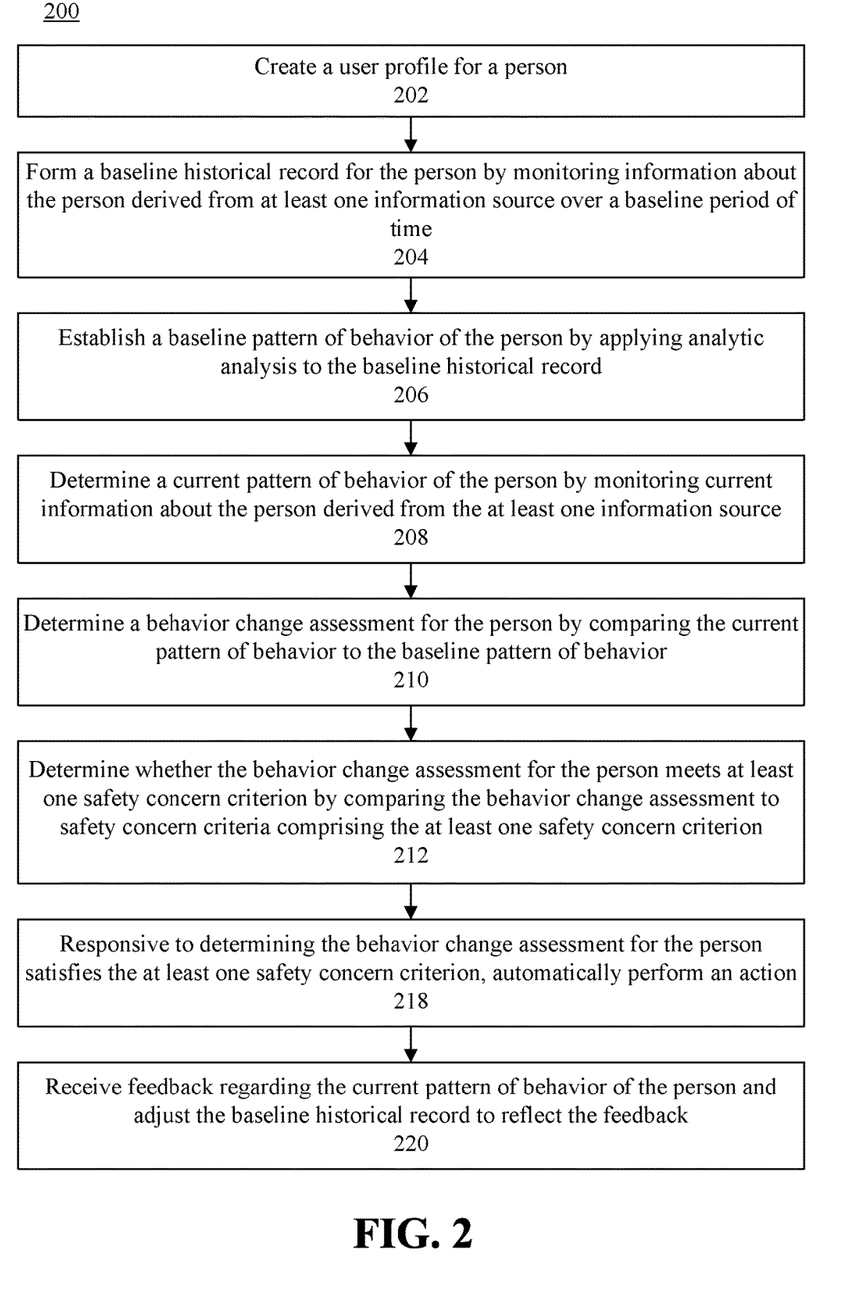
FIG. 2 is a flow chart illustrating an example of a method of performing an action responsive to determining a behavior change assessment for a person satisfies at least one safety concern criterion.

FIG. 2 is a flow chart illustrating an example of a method 200 of performing an action responsive to determining a behavior change assessment for a person satisfies at least one safety concern criterion. The method 200 can be implemented by the safety monitoring system 110, for example using a processor and memory to execute a suitably configured safety monitoring application.

At step 202, the safety monitoring system 110 can create a user profile 165 for the person 115. In illustration, the person 115, the user 155 or another authorized user of the safety monitoring system 110 can, using a user interface presented by the safety monitoring system 110, initiate the safety monitoring system 110 to create the user profile 165. In the user profile 165, the person 115, the user 155 or other authorized user can enter user profile data for the person 115. The user profile data can include contact information for the person 115, for example, one or more telephone numbers, one or more e-mail addresses, one or more text messaging identifiers (e.g., mobile telephone numbers), information indicating a preferred mode of receiving notifications and other information.

The user profile 165 of the person 115 also can include user names/user identifiers for users, such as the user 155, who are pre-authorized to receive from the safety monitoring system 110 notifications, for example safety notifications 160, pertaining to the person 115. The user profile 165 of the person 115 further can indicate a relationship of the user 155 to the person 115, as well as any other desired information. Further, the user profile 165 of the person 115 can indicate which users are to receive certain types of notifications from the safety monitoring system 110. For example, the user profile 165 of the person 115 can indicate that the user 155 is to receive notifications regarding a change in sentiment of the person 115 (e.g., notifications indicating that the person 115 may be experiencing depression), indicate that another user, such as a medical professional, is to receive notifications regarding a medical condition (e.g., notifications indicating a change in vital signs of the person 115), and so on. In addition, the user profile 165 of the person 115 can indicate a service, such as an emergency medical service (e.g., ambulance company or fire department), is to receive notifications regarding a medical emergency (e.g., notifications indicating a significant change in vital signs of the person 115). Still, the user profile 165 of the person 115 can indicate any other users/services that are to receive notifications in response to behavior and/or biometric parameter changes of the person 115 and the present arrangements are not limited in this regard.

In one arrangement, the user profile 165 of the person 115 can include contact information for the user 155, for example, one or more telephone numbers, one or more e-mail addresses, one or more text messaging identifiers (e.g., mobile telephone numbers), information indicating a preferred mode of receiving safety notifications 160 and other information. In another arrangement, the safety monitoring system 110 can create a user profile 165 for the user 155 which includes the contact information for the user 155, and the safety monitoring system 110 can create a link between the user profile 165 of the person 115 and the user profile of the user 155.

The user profile 165 of the person 115 also can include user names/user identifiers and passwords used by the person 115 to access social networking service(s) hosted by the social networking system(s) 130, access web based forum(s) hosted by the web based forum system(s) 132, access the electronic messaging system(s) 134, access the e-mail system(s) 136, access the electronic calendaring system(s) 138 and/or access information from the activity detection device(s) 140. In one arrangement, a user, such as the user 155, creating the user profile 165 for the person 115 can enter the user names/user identifiers and passwords. In another arrangement, the safety monitoring system 110 can present to the person 115 an interactive user interface in which to enter the user names/user identifiers and passwords, even if other information in the user profile 165 of the person 115 is entered by the user 155. Thus, the user 155 need not have direct access to information sent by, posted by or received by the person 115 using the information sources 130-140.

In one arrangement, responsive to the user profile 165 being created, the safety monitoring system 110 can define a default baseline period of time in the user profile 165. In another arrangement, the person creating the user profile can define the baseline period of time in the user profile 165. The baseline period of time can be defined using a start date/time and an end date/time. The baseline period of time can be a period of time that extends one or more days, weeks, months and/or years.

At step 204, the safety monitoring system 110 can form a baseline historical record 170 for the person 115 by monitoring information about the person 115 derived from at least one information source 130-140 over the baseline period of time. In illustration, the safety monitoring system 110 can use the person's user names/user identifiers and passwords to access the information from the information sources 130-140, and store that information to a computer readable storage medium.

Such information can include, but is not limited to, messages posted or accessed by the person 115 in the social networking service(s) hosted by the social networking system(s) 130 and/or web based forum(s) hosted by the web based forum system(s) 132 during the baseline period of time, text messages sent or received by the person 115 using the electronic messaging system(s) 134 during the baseline period of time, and e-mails sent by or received by the person 115 using the e-mail system(s) 136 during the baseline period of time. The information also can include data pertaining to calendaring information entered, changed or deleted by the person 115 in the electronic calendaring system(s) 138 during the baseline period of time. In addition, the information can include dates/times (e.g., time stamps) indicating when the person 115 created, received and/or accessed posts, text messages, e-mails, added, deleted or changed calendaring entries, etc.

The information further can include data pertaining to locations visited by the person 115 and activities of the person 115 detected by the activity detection device(s) 140 during the baseline period of time. Moreover, the information can include dates/times when the person visits the locations and participates in the activities. In addition, the information can include biometric parameters of the person 115 measured during the baseline period of time by the activity detection device(s) 140. Examples of the biometric parameters include, but are not limited to, the person's heart rate, respiration rate, oxygen level, body temperature and blood pressure. Again, the information can include dates/times when the biometric parameters are measured. The information also can include images of the person 115, for example images which the safety monitoring system 110 may process to identify gestures (e.g., facial gestures, etc.) made by the person 115.

At step 206, the safety monitoring system 110 can establish a baseline pattern of behavior 172 of the person 115 by applying analytic analysis to the baseline historical record 170. In illustration, the safety monitoring system 110 can implement natural language processing (NLP), semantic analysis and cognitive analysis on information contained in the baseline historical record 170 pertaining to posts created by and/or accessed by the person 115, and text messages and e-mails sent and/or received by the person 115. Based on the NLP, semantic analysis and cognitive analysis, the safety monitoring system 110 can determine sentiments expressed by the person 115 in the posts text messages and e-mails, and store corresponding information in the baseline pattern of behavior 172. The safety monitoring system 110 also can determine sentiments of the person 115 based on performing image analysis on images captures of the person 115 and analyzing user gestures made by the person 115. Further, the safety monitoring system 110 can implement cognitive analysis, or access another system to implement the cognitive analysis to process results from the NLP, semantic analysis, and gesture analysis, as well as information contained in the baseline historical record 170, to generate data for the baseline pattern of behavior 172. An example of a system known in the art that performs cognitive analysis is IBM Watson™. The safety monitoring system 110 can be configured to interface with IBM Watson™ to perform cognitive analysis, though the present arrangements are not limited in this regard.

The safety monitoring system 110 also can store in the baseline pattern of behavior 172 information corresponding to events calendared by the user, locations the user visits, activities of the user and typical biometric parameters of the user during various activities. In addition, the safety monitoring system 110 can store in the baseline pattern of behavior 172 information indicating relationships between the determined sentiments of the person 115 and the calendared events, activities and biometric parameters. For instance, the safety monitoring system 110 can, based on the baseline historical record 170, identify and store temporal correspondences between the sentiments of the person 115 expressed during post, text message and e-mail activities and the time/dates various events and activities occurred, and perform cognitive analysis on such data to generate data for the baseline pattern of behavior 172.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the safety monitoring system 110 to implement NLP and semantic analysis. Cognitive analysis also is known in the art. Cognitive analysis uses various analysis techniques to process data, for example machine learning processes, statistical analysis processes, NLP and semantic analysis.

At step 208, the safety monitoring system 110 can determine a current pattern of behavior 174 of the person 115 by monitoring current information about the person 115 derived from the at least one information source 130-140. The safety monitoring system 110 can determine the current pattern of behavior 174 as previously described for the baseline pattern of behavior 172 except rather than determining the current pattern of behavior 174 by analyzing the baseline historical record 170, the safety monitoring system 110 can determine the current pattern of behavior 174 by analyzing current information 145 about the person 115. The current information 145 about the person 115 can include information the safety monitoring system 110 accesses from the information sources 130-140 in a time frame extending from the present date/time back an amount of time. For example, the time frame can extend from the present date/time back a number of minutes, a number of hours, a number of days and/or a number of weeks.

At step 210, the safety monitoring system 110 can determine a behavior change assessment 176 for the person 115 by comparing the current pattern of behavior 174 to the baseline pattern of behavior 172. In illustration, the safety monitoring system 110 can identify deviations in the current pattern of behavior 174 from the baseline pattern of behavior 172 and store data corresponding to the deviations in the behavior change assessment 176. By way of example, if the baseline pattern of behavior 172 indicates that the person 115 typically exercises at approximately the same time on certain days of the week, but the current pattern of behavior 174 indicates that the person has missed one or more of such activities, the safety monitoring system 110 can indicate such in the behavior change assessment 176 as a change in activities of the person. In another example, if the baseline pattern of behavior 172 indicates that the person 115 typically has a certain heart rate and/or respiration rate while performing normal daily activities, but the current pattern of behavior 174 indicates that the heart rate and/or respiration rate is significantly higher or lower than that indicated in the baseline pattern of behavior 172, the safety monitoring system 110 can indicate such in the behavior change assessment 176 as a change in biometric parameters of the person.

In another example, if the baseline pattern of behavior 172 indicates that the person 115 typically visits a particular place, such as a restaurant, gym, park, a place of employment, a school and so on, on certain days of the week or a certain number of times per week, but the current pattern of behavior 174 indicates that the person recently (e.g., the present day or present week) has not visited that particular place, the safety monitoring system 110 can indicate such in the behavior change assessment 176 as a change in social behavior of the person 115.

In another example, if the baseline pattern of behavior 172 indicates that the person 115 typically expresses a neutral to positive attitude in posts, text messages and e-mails, but the current pattern of behavior 174 indicates that the person 115 is expressing a negative attitude in such communications, the safety monitoring system 110 can indicate such in the behavior change assessment 176 as a change in sentiment of the person 115. In a further example, if the baseline pattern of behavior 172 indicates that the person 115 typically accesses social media posts containing a certain type of content, but the current pattern of behavior 174 indicates that the person has recently been accessing different types of social media posts (e.g., social media posts that pertain to controversial and/or destructive topics), the safety monitoring system 110 can indicate such in the behavior change assessment 176 as a change in sentiment of the person 115. Still, the safety monitoring system 110 can indicate any other behavior and/or biometric parameter changes in the behavior change assessment 176, and the present arrangements are not limited in this regard.

At step 212, the safety monitoring system 110 can determine whether the behavior change assessment 176 for the person 115 meets at least one safety concern criterion by comparing the behavior change assessment 176 to safety concern criteria 178 comprising the at least one safety concern criterion. In illustration, the safety concern criteria 178 can include criteria indicating standards that, if met by the behavior change assessment 176, indicate a safety concern for the person 115.

Examples of such criteria can include, but are not limited to, a threshold level of change in social behavior, a threshold level of change in sentiment, a threshold level of change in activities and a threshold level of change in biometric parameters. For instance, a criterion can be that the person 115 fails to participate in a threshold number of social activities (e.g., visiting a restaurant, park, place of work, school and so on) in which the person 115 normally participates. Another criterion can be that the person 115 fails to perform a threshold number of activities (e.g., exercising) which the person 115 normally performs. Another criterion can be that the person 115 generates, over a particular length of time, a number of text messages, e-mails and/or posts expressing a negative sentiment, wherein the number exceeds by a threshold amount a number of text messages, e-mails and/or posts expressing a negative sentiment that that the person 115 typically generates within that length of time. Another criterion can be that the person 115 generates, over a particular length of time, a number of text messages, e-mails and/or posts, wherein the number is less than, by a threshold amount, the number of text messages, e-mails and/or posts the person 115 typically generates over that length of time. Another criterion can be that the person 115 stops communicating via text messaging, e-mail and/or posts to contacts of the person 115 who the person 115 normally communicates with via text messaging, e-mail and/or posts. Still, the safety concern criteria 178 can include a myriad of other criterion and the present arrangements are not limited in this regard.

At step 218, the safety monitoring system 110 can, responsive to determining the behavior change assessment for the person 115 satisfies the at least one safety concern criterion, automatically perform an action. An example of such an action is automatically communicating a notification, for instance a safety notification 160, to one or more users 155. For example, the safety monitoring system 110 can communicate a notification to the client device 150 used by the user 155. The safety notification 160 can be a text message, an e-mail, an automated telephone call, or any other suitable type of communication. In the case that the safety notification is an automated telephone call, the safety monitoring system 110 can perform speech synthesis to convey audibly the information contained in the safety notification 160.

The safety notification 160 can provide one or more reasons why the user 155 should check on the person 115. For example, the safety notification 160 can include information pertaining to the person 115, including information indicating the at least one safety concern criterion 178 that is satisfied, and/or behavior change assessment 176 data that satisfies the safety concern criterion 178. For example, the safety notification 160 can include information indicating that the person 115 has missed one or more social activities, has failed to perform one or more normal activities, has been expressing a negative sentiment in communications, has stopped communicating with one or more contacts the person 115 normally communicates with, has experienced a change in biometric parameters, and so on.

The users 155 can be users who are pre-authorized to receive the safety notification 160, for example in the user profile 165 of the person 115. In one arrangement, a user 155 to whom a notification is sent can be a user who is indicated in the user profile 165 of the person 115 to receive that type of notification. For example, the safety monitoring system 110 can identify a particular safety concern criterion that is met. In response, the safety monitoring system 110 can access the user profile 165 of the person 115 to determine at least one user 155 who is associated with the safety concern criterion in the user profile 165, and thus is a user 155 to whom the safety notification 160 is to be sent in response to the particular safety concern criterion being satisfied. The safety monitoring system 110 can automatically communicate the safety notification 160 to the at least one user 155 who is associated with the safety concern criterion.

In illustration, if the person 115 has missed one or more social activities, has failed to perform one or more normal activities, or has expressed negative sentiment, the safety monitoring system 110 can communicate the safety notification 160 to a parent, a child and/or a friend of the person 115. If the person's biometric parameters have changed by at least a first threshold amount, but less than a second threshold amount, the safety monitoring system 110 can communicate the safety notification 160 to a caregiver and, optionally, a parent, a child and/or a friend. If the person's biometric parameters have changed by at least the second threshold amount, the safety monitoring system 110 can communicate the safety notification 160 to an emergency response service, such as an ambulance company or fire department. In such case, the safety monitoring system 110 also can communicate the safety notification 160 to a caregiver, a parent, a child and/or a friend.

At step 220, the safety monitoring system 110 can receive feedback regarding the current pattern of behavior 174 of the person 115 and adjust the baseline historical record 170 to reflect the feedback. In illustration, in response to receiving a safety notification 160, the user 155 may check on the person 115. After attempting to check on the person, the user 155 can respond to the safety notification 160, for example by selecting a hyperlink in a text message or e-mail received as the safety notification 160 that navigates the user 155, via the Internet, to a web based user interface of the safety monitoring system. The user interface can present to the user 155 an indicator for the information in the current pattern of behavior 172 that triggered the safety notification 160. In addition, the user interface can present one or more input fields via which the user 155 can indicate whether the user 155 was able to contact the person 115, whether other users and/or an emergency response agency/company should be contacted, and whether the information should continue to trigger safety notifications 160. The indicator for the information in the current pattern of behavior 172 need not specifically include the specific information that triggered the safety notification 160, but instead can include generalized information, such as "social activities were missed," "daily activities were missed," "biometric parameters changed," "change in sentiment," etc.

If the user 155 indicates that the information should continue to trigger safety notifications 160 if again generated, no changes need be made to the baseline historical record 170. If, however, the user 155 indicates that the information should not continue to trigger safety notifications 160 if again generated, the safety monitoring system 110 can update the baseline historical record 170 to include that information. Further, the safety monitoring system 110 can update the baseline pattern of behavior 172 accordingly.

If the user 155 indicates that the user 155 was not able to contact the person 115, the safety monitoring system 110 optionally can communicate a notification to the person 115 requesting the person 115 contact the user 155. If the user 155 indicates that other users and/or an emergency response agency/company should be contacted, the safety monitoring system 110 can automatically send safety notifications 160 to the other users and/or emergency response agency/company.

In one arrangement, rather than accessing a web based user interface, the user 155 can place a call to a call system for the safety monitoring system 110 and entering a code (e.g., a series of keypad entries) indicated in an automated telephone call received from the safety monitoring system 110. During the call, the call system can present the information in the current pattern of behavior 172 that triggered the safety notification 160 and prompt the user to select a key on the phone to indicate whether the information should continue to trigger safety notifications 160.

Figure 3:
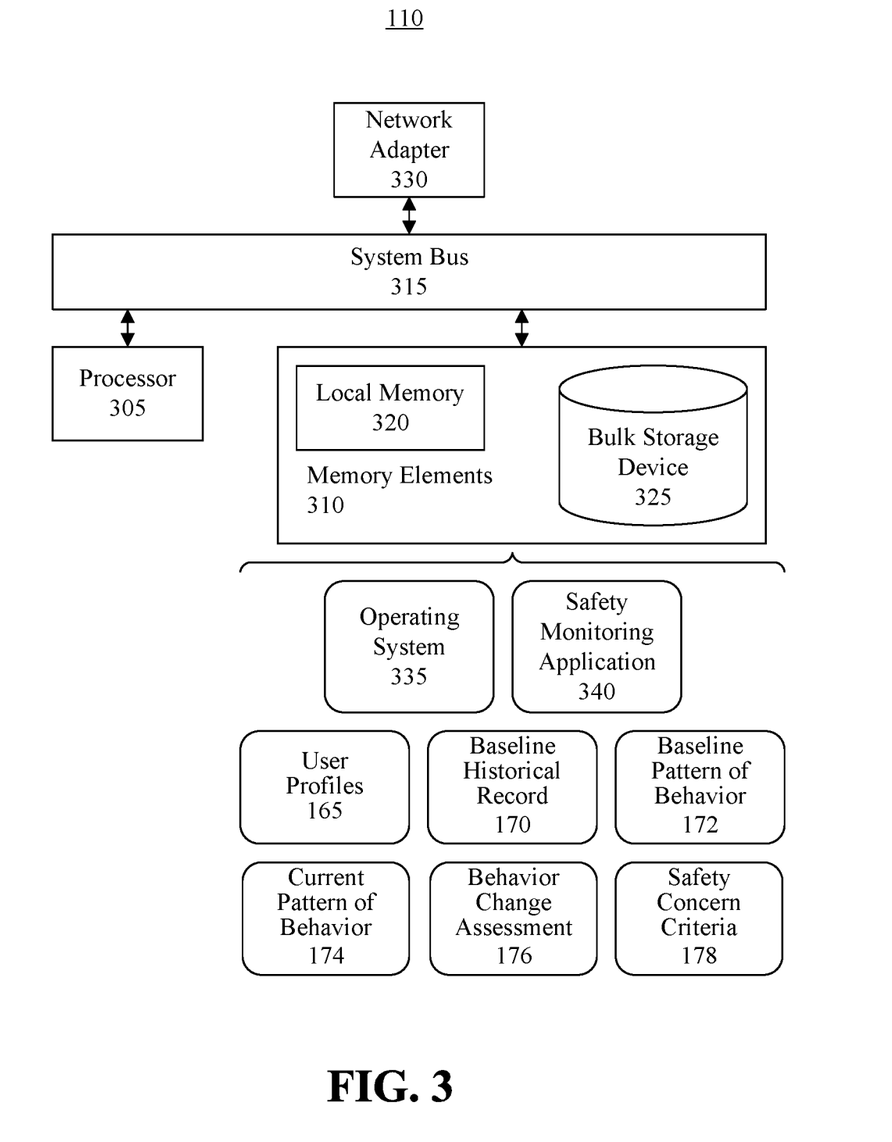
FIG. 3 is a block diagram illustrating example architecture for a safety monitoring system.

FIG. 3 is a block diagram illustrating example architecture for a safety monitoring system 110. The safety monitoring system 110 can include at least one processor 305 (e.g., a central processing unit) coupled to memory elements 310 through a system bus 315 or other suitable circuitry. As such, the safety monitoring system 110 can store program code within the memory elements 310. The processor 305 can execute the program code accessed from the memory elements 310 via the system bus 315. It should be appreciated that the safety monitoring system 110 can be implemented in the form of any system including a processor and memory that is capable of performing the functions and/or operations described within this specification. For example, the safety monitoring system 110 can be implemented as a server or as a plurality of communicatively linked servers.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The safety monitoring system 110 also can include one or more cache memories (not shown) that provide temporary storage of at least some program code in order to reduce the number of times program code must be retrieved from the bulk storage device 325 during execution.

One or more network adapters 330 can be coupled to safety monitoring system 110 to enable the safety monitoring system 110 to become coupled to other systems, computer systems, remote printers, and/or remote storage devices through intervening private or public networks. Modems, cable modems, transceivers, and Ethernet cards are examples of different types of network adapters 330 that can be used with the safety monitoring system 110.

As pictured in FIG. 3, the memory elements 310 can store the components of the safety monitoring system 110, namely an operating system 335 and a safety monitoring application 340. The safety monitoring application 340 can execute in a computing environment hosted by the operating system 335. Being implemented in the form of executable program code, the operating system 335 and the safety monitoring application 340 can be executed by the safety monitoring system 110 and, as such, can be considered part of the safety monitoring system 110. The memory elements 310 also can store, at least temporarily, the user profiles 165, baseline historical record 170, baseline pattern of behavior 172, current pattern of behavior 174, behavior change assessment 176 and safety concern criteria 178, which are functional data structures that impart functionality when employed as part of the safety monitoring system 110. In illustration, the user profiles 165, baseline historical record 170, baseline pattern of behavior 172, current pattern of behavior 174, behavior change assessment 176 and safety concern criteria 178 can be persisted to the bulk storage device 325, or to another bulk storage device to which the safety monitoring system 110 is communicatively linked. The user profiles 165, baseline historical record 170, baseline pattern of behavior 172, current pattern of behavior 174, behavior change assessment 176 and safety concern criteria 178, or data contained therein, can be loaded into local memory 320 to facilitate processing of the data.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   forming a baseline historical record for a person by monitoring information about the person derived from at least one information source over a baseline period of time;
   establishing a baseline pattern of behavior of the person by applying analytic analysis to the baseline historical record, the analytic analysis comprising implementing, using a processor, natural language processing and semantic analysis on information contained in the baseline historical record;
   determining a current pattern of behavior of the person by monitoring current information about the person derived from the at least one information source;
   determining, using the processor, a behavior change assessment for the person by comparing the current pattern of behavior to the baseline pattern of behavior;
   determining whether the behavior change assessment for the person meets at least one safety concern criterion by comparing the behavior change assessment to safety concern criteria comprising the at least one safety concern criterion; and
   responsive to determining the behavior change assessment for the person meets the at least one safety concern criterion, automatically performing an action.

2. The method of claim 1, wherein the at least one information source includes at least one information source selected from a group consisting of web based forum and a social networking service.

3. The method of claim 1, wherein the at least one information source includes at least one information source selected from a group consisting of an electronic messaging system, an e-mail system, an electronic calendar, and at least one device that detects at least one activity of the person.

4. The method of claim 1, wherein the behavior change assessment for the person identifies at least one behavior change selected from a group consisting of a change in activities performed by the person, a change in sentiment of the person, and a change in social behavior of the person.

5. The method of claim 1, wherein automatically performing the action comprises automatically communicating a notification regarding the person to a user who is pre-authorized to receive the notification.

6. The method of claim 1, wherein automatically performing the action comprises:

identifying the at least one safety concern criterion;

determining at least a first of a plurality of users identified in a user profile of the person who is to receive a notification regarding the person in response to the behavior change assessment for the person meeting the identified at least one safety concern criterion, wherein the user profile of the person associates the first user with the identified at least one safety concern criterion; and automatically communicating the notification regarding the person to the first user.

7. The method of claim 1, further comprising:

receiving a feedback regarding the current pattern of behavior of the person; and adjusting the baseline historical record to reflect the feedback.

8. A system, comprising:

a processor programmed to initiate executable operations comprising:

forming a baseline historical record for a person by monitoring information about the person derived from at least one information source over a baseline period of time;

establishing a baseline pattern of behavior of the person by applying analytic analysis to the baseline historical record, the analytic analysis comprising implementing natural language processing and semantic analysis on information contained in the baseline historical record;

determining a current pattern of behavior of the person by monitoring current information about the person derived from the at least one information source;

determining a behavior change assessment for the person by comparing the current pattern of behavior to the baseline pattern of behavior;

determining whether the behavior change assessment for the person meets at least one safety concern criterion by comparing the behavior change assessment to safety concern criteria comprising the at least one safety concern criterion; and responsive to determining the behavior change assessment for the person meets the at least one safety concern criterion, automatically performing an action.

9. The system of claim 8, wherein the at least one information source includes at least one information source selected from a group consisting of web based forum and a social networking service.

10. The system of claim 8, wherein the at least one information source includes at least one information source selected from a group consisting of an electronic messaging system, an e-mail system, an electronic calendar, and at least one device that detects at least one activity of the person.

11. The system of claim 8, wherein the behavior change assessment for the person identifies at least one behavior change selected from a group consisting of a change in activities performed by the person, a change in sentiment of the person, and a change in social behavior of the person.

12. The system of claim 8, wherein automatically performing the action comprises automatically communicating a notification regarding the person to a user who is pre-authorized to receive the notification.

13. The system of claim 8, wherein automatically performing the action comprises:

identifying the at least one safety concern criterion;

determining at least a first of a plurality of users identified in a user profile of the person who is to receive a notification regarding the person in response to the behavior change assessment for the person meeting the identified at least one safety concern criterion, wherein the user profile of the person associates the first user with the identified at least one safety concern criterion; and automatically communicating the notification regarding the person to the first user.

14. The system of claim 8, the executable operations further comprising:

receiving a feedback regarding the current pattern of behavior of the person; and adjusting the baseline historical record to reflect the feedback.

15. A computer program product comprising a computer readable storage medium having program code stored thereon, the program code executable by a processor to perform a method comprising:

forming, by the processor, a baseline historical record for a person by monitoring information about the person derived from at least one information source over a baseline period of time;

establishing, by the processor, a baseline pattern of behavior of the person by applying analytic analysis to the baseline historical record, the analytic analysis comprising implementing natural language processing and semantic analysis on information contained in the baseline historical record;

determining, by the processor, a current pattern of behavior of the person by monitoring current information about the person derived from the at least one information source;

determining, by the processor, a behavior change assessment for the person by comparing the current pattern of behavior to the baseline pattern of behavior;

determining, by the processor, whether the behavior change assessment for the person meets at least one safety concern criterion by comparing the behavior change assessment to safety concern criteria comprising the at least one safety concern criterion; and responsive to determining the behavior change assessment for the person meets the at least one safety concern criterion, automatically performing, by the processor, an action.

16. The computer program product of claim 15, wherein the at least one information source includes at least one information source selected from a group consisting of web based forum and a social networking service.

17. The computer program product of claim 15, wherein the at least one information source includes at least one information source selected from a group consisting of an electronic messaging system, an e-mail system, an electronic calendar, and at least one device that detects at least one activity of the person.

18. The computer program product of claim 15, wherein the behavior change assessment for the person identifies at least one behavior change selected from a group consisting of a change in activities performed by the person, a change in sentiment of the person, and a change in social behavior of the person.

19. The computer program product of claim 15, wherein automatically performing the action comprises automatically communicating a notification regarding the person to a user who is pre-authorized to receive the notification.

20. The computer program product of claim 15, wherein automatically performing the action comprises:
   identifying the at least one safety concern criterion;
   determining at least a first of a plurality of users identified in a user profile of the person who is to receive a notification regarding the person in response to the behavior change assessment for the person meeting the identified at least one safety concern criterion, wherein the user profile of the person associates the first user with the identified at least one safety concern criterion; and
   automatically communicating the notification regarding the person to the first user.

* * * * *